April 25, 1944.     P. F. SPERRY     2,347,519
MOTION PICTURE CAMERA
Filed Oct. 22, 1941     7 Sheets-Sheet 3

April 25, 1944. P. F. SPERRY 2,347,519
MOTION PICTURE CAMERA
Filed Oct. 22, 1941 7 Sheets-Sheet 4

April 25, 1944.   P. F. SPERRY   2,347,519
MOTION PICTURE CAMERA
Filed Oct. 22, 1941   7 Sheets-Sheet 6

Inventor:
Philmore F. Sperry
By: Bair Carlson Hiffaugh & Wells
Attys.

Patented Apr. 25, 1944

2,347,519

UNITED STATES PATENT OFFICE 2,347,519

MOTION PICTURE CAMERA

Philmore F. Sperry, Chicago, Ill.; Helen B. Sperry, executrix of said Sperry, deceased, assignor, by mesne assignments, to Theodore H. Briskin, Philip F. Briskin, and Jack Briskin Application October 22, 1941, Serial No. 416,056

17 Claims. (Cl. 88—17)

The present invention relates to motion picture cameras and is particularly directed to the novel camera construction whereby the camera is adapted to receive and position a film magazine containing the film to be used in the camera.

It is the purpose of the present invention to provide in a camera of this character a sliding film magazine compartment adapted to receive and position a film magazine in combination with the cooperating parts on the drawer and camera casing so as to open the film magazine as the drawer is moved to closed position and to engage the film in the film magazine with an intermittent film moving finger of the camera.

Motion picture film particularly for 8 mm. motion pictures is now on sale in film magazines containing a complete roll of film of the double track type. The magazine is sold with the film therein and with a shutter which is normally closed so that the film is completely protected. The film magazine carries a shoe for guiding the film past the exposure apertures which are covered by the shutter, the shoe being provided with posts adapted to engage a fixed part of the camera to insure fixed distance between the film and the camera lens. In the film magazine there are of course reels so arranged that the film may be unwound from one of the reels and wound on another during the exposure of one track. Thereafter by turning the magazine over and reinserting it in the camera the film may be unwound from the second reel and returned to the first reel as the second track on the film is exposed.

The present invention concerns itself with the mechanism cooperating with a film magazine of the character described to enable the operator to use the film magazine without danger of inadvertent exposure and with a minimum danger of damage to the delicate camera parts in insertion and withdrawal of the film magazine.

A particular object of the invention is to provide a novel film magazine-receiving mechanism in a camera whereby the magazine is positioned in a positive manner in proper relation to the camera lens without the necessity of any attention on the part of the operator.

Another purpose of the invention is the provision of a novel magazine-receiving compartment in a camera, which compartment is movable to bring the magazine reel into driving connection with the camera driving mechanism by the act of positioning the magazine.

Another object of the invention is the provision in a magazine of the character described of means whereby the film in the film magazine is brought into engagement with a film driving finger of the camera magazine without disturbing the normal operative position of the finger at any time.

Other and more detailed objects and advantages of the present invention will appear from the following decription, reference being had to the accompanying drawings wherein a preferred form of the invention is shown.

Referring now particularly to Figs. 1-6, 15, 16 and 17 of the drawings the invention is embodied in a motion picture camera. The camera includes a casing part 1 which serves to enclose a driving spring and mechanism whereby the energy stored in the spring may be utilized and controlled in operating the film advancing claw and the shutter. The details of this mechanism form no part of the present invention. The camera includes a second casing part 2 in which a film magazine-receiving chamber 3 is provided. A view finder 4 is mounted on the casing part 1. A camera lens 5 is mounted on the casing part 2. The lens 5 is carried by a front cover plate 6 which covers a front frame member 7 (see Fig. 6).

Figure 1:
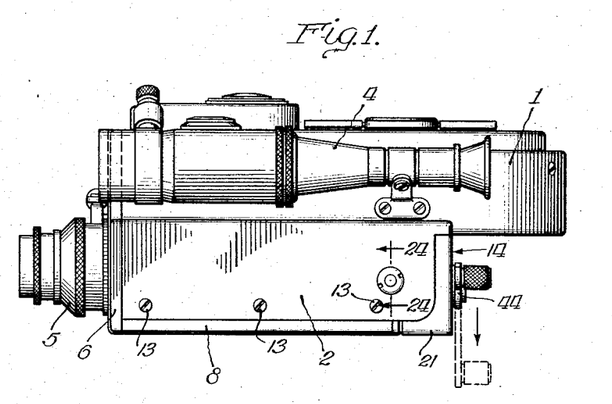
Fig. 1 is a plan view of a camera embodying the invention.
Figure 15:
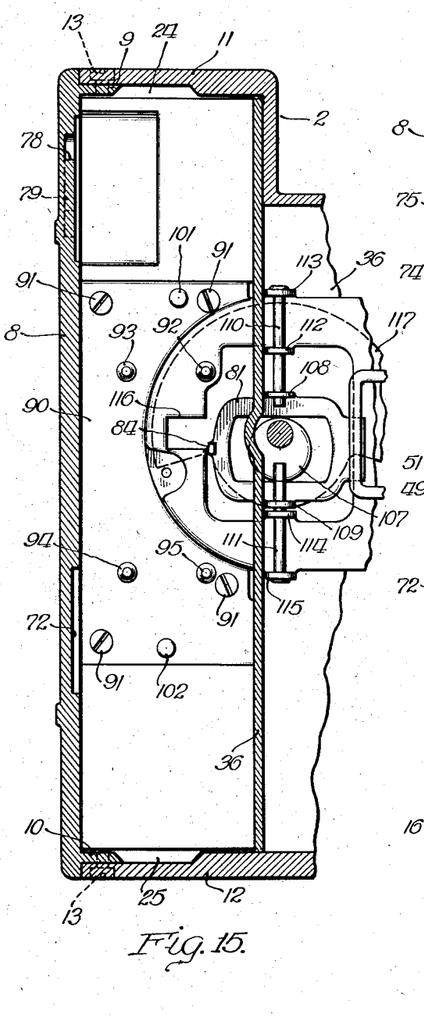
Fig. 15 is a sectional view taken on the line 15—15 of Fig. 6.
Figure 16:
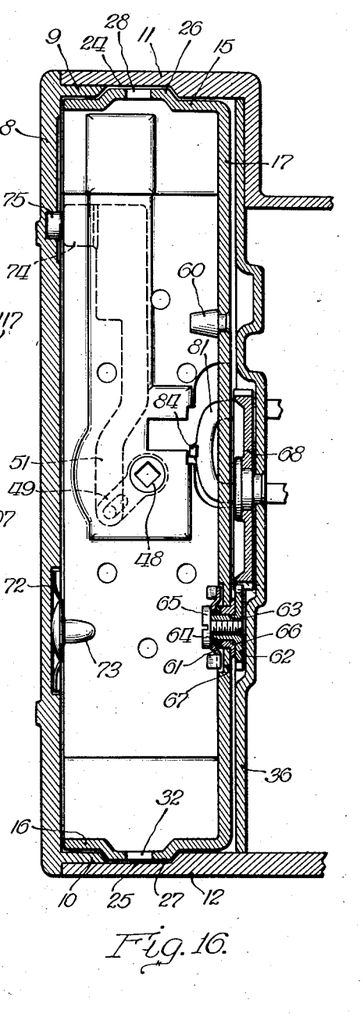
Fig. 16 is a sectional view taken on the line 16—16 of Fig. 6, with the drawer closed.
Figure 17:
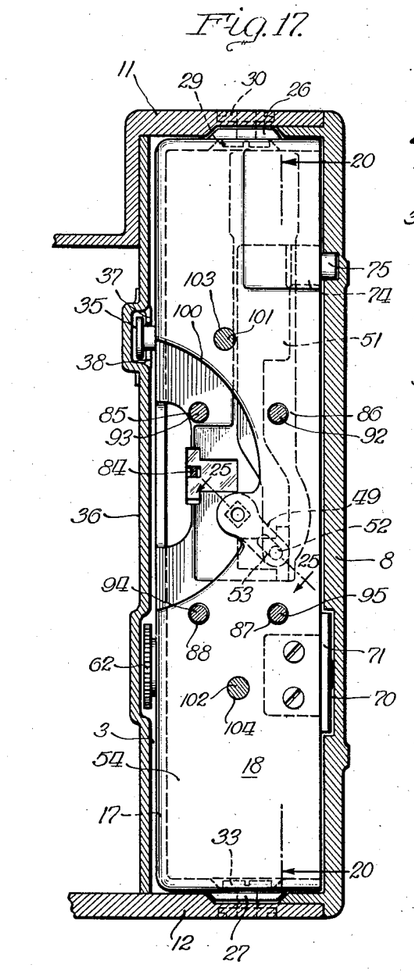
Fig. 17 is a fragmentary sectional view taken on the line 17—17 of Fig. 2, showing the drawer closed with a film magazine therein.

The camera has a side cover plate 8 which fits over the chamber 3 and which has ribs 9—10 fitting inside the top and bottom walls 11 and 12 of the casing part 2. The ribs are secured by screws 13 (Figs. 1 and 15).

Figure 2:
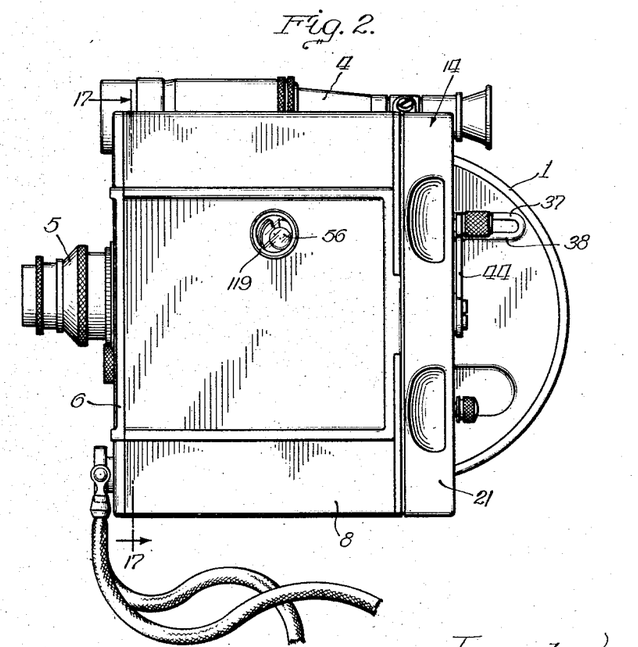
Fig. 2 is a view in side elevation of the camera.
Figure 3:
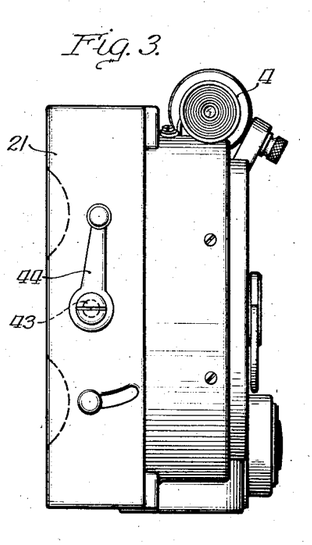
Fig. 3 is an end view of the camera looking at Fig. 2 from the right.
Figure 5:
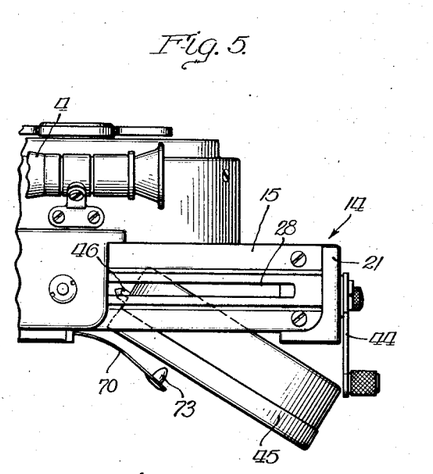
Fig. 5 is a fragmentary plan view of the camera showing the film magazine drawer open and a magazine partially inserted therein.
Figure 6:
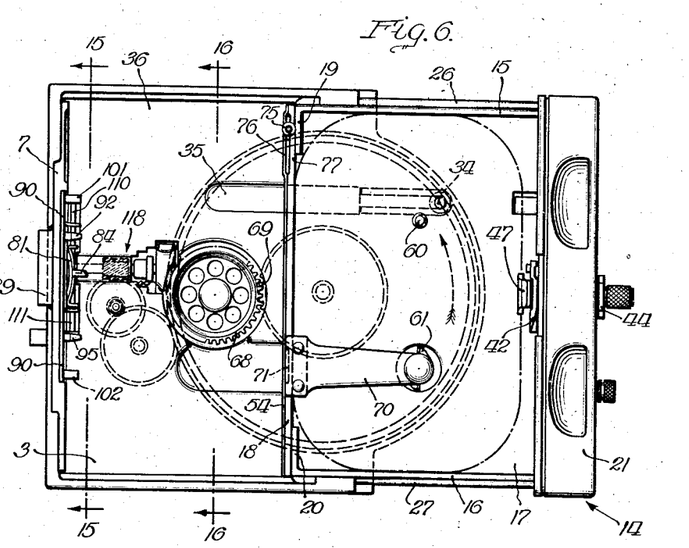
Fig. 6 is a view in side elevation of the camera with the film magazine drawer open and the camera front cover removed, the magazine being in place in the drawer.
Figures 7, 8:
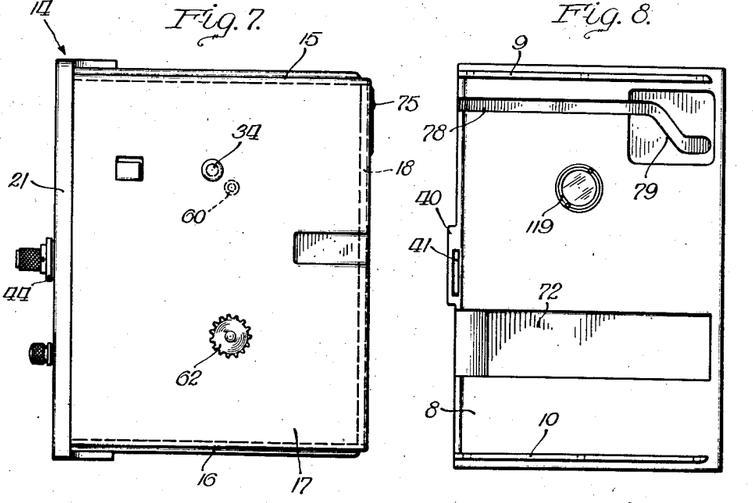
Fig. 7 is a bottom plan view of the film magazine drawer.
Fig. 8 is a view in side elevation of the inner face of the camera front cover.
Figure 9:
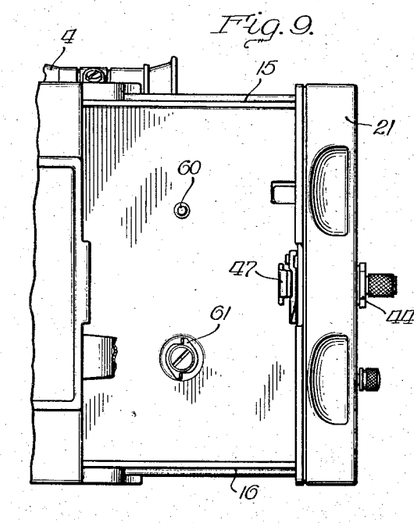
Fig. 9 is a fragmentary view in side elevation of the camera with the film magazine-receiving drawer open and the magazine removed.
Figure 10:
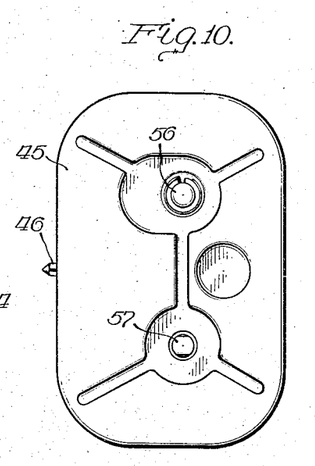
Fig. 10 is a plan view of the film magazine showing it in the position in which it would be first inserted in the magazine-receiving drawer of the camera.
Figure 11:
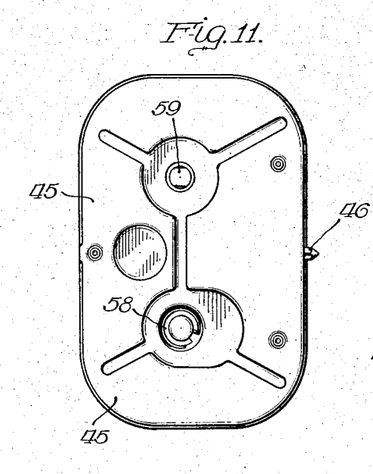
Fig. 11 is a view like Fig. 10 but showing the other side of the film magazine.

The inner face of the plate 8 is shown in detail in Fig. 8. It cooperates with the walls of the casing part 2 to guide a film magazine-receiving member 14 (Figs. 4-7). The member 14 is a sliding drawer having side walls 15 and 16 formed integrally with a bottom wall 17. The drawer 14 has a front wall 18 which is turned up from the bottom wall 17. The side walls 15 and 16 have inturned end portions welded to the front wall 18. The member 17 has a rear wall 21 which is fastened to the side walls 15 and 16 by screws (see Fig. 5). The rear wall 21 is a bar which is shaped to match the rear ends 22 and 23 of the casing walls 11 and 12 and the rear edge of the cover plate 8 to close the chamber 3 when the drawer 14 is moved to closed position as shown in Figs. 1 and 2.

It will be noted that the ribs 9 and 10 on the cover 8 cooperate with the walls 11 and 12 to form guide channels 24 and 25. Each of the drawer side walls 15 and 16 has an offset portion 26—27 riding in the corresponding guide channel. The portion 26 has a longitudinally running slot 28 to receive a headed guide pin 29 (see Figs. 17 and 24). The pin 29 has a nut 30 that fits an aperture 31 in the casing wall 11. The portion 27 has a slot 32 to receive a headed guide pin 33 that is a duplicate of the pin 29 and is held in the same way.

Figures 20, 21, 22, 23, 24, 25:
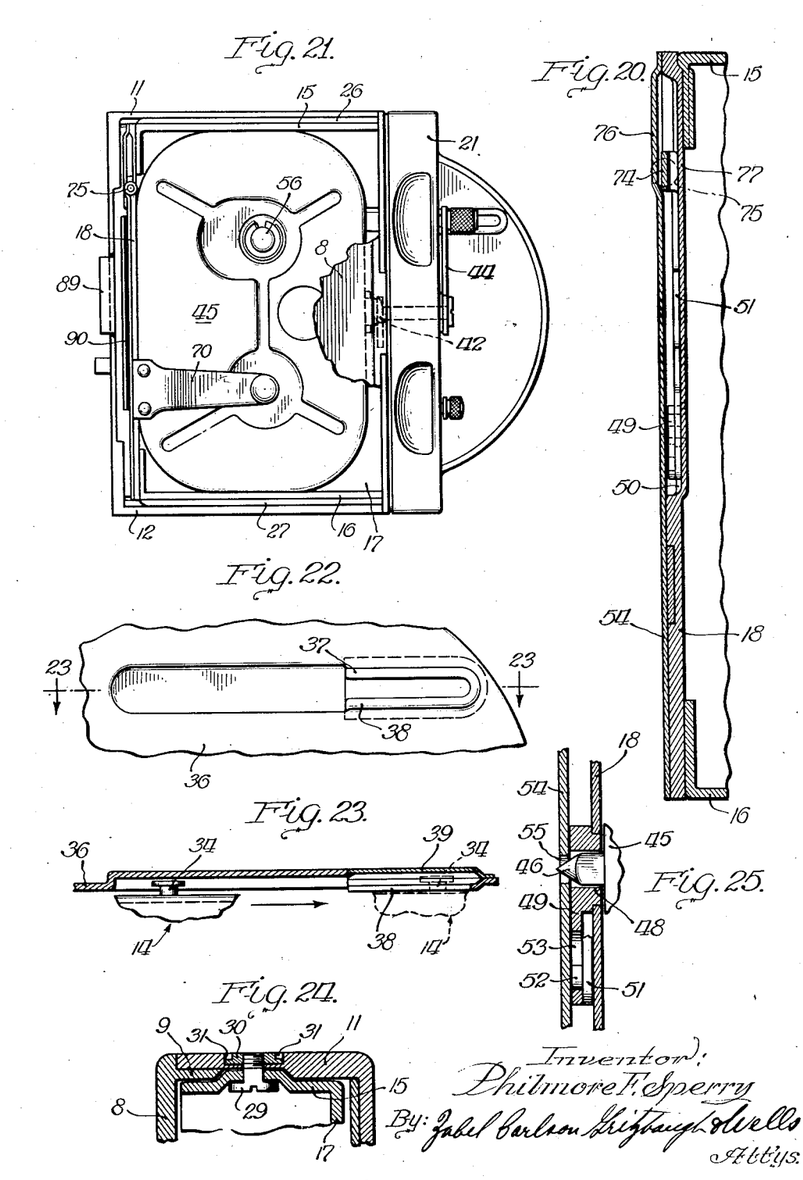
Fig. 20 is a sectional view taken substantially on the line 20—20 of Fig. 17.
Fig. 21 is a view in side elevation of the camera with the drawer closed and the cover plates removed.
Fig. 22 is a fragmentary plan view of a portion of the camera wall beneath the drawer illustrating the provision of a channel for receiving a pin on the drawer to limit outward movement of the drawer with respect to the camera casing.
Fig. 23 is a sectional view taken on the line 23—23 of Fig. 22.
Fig. 24 is a fragmentary sectional view taken on the line 24—24 of Fig. 1, illustrating the side guide construction for the film magazine.
Fig. 25 is a fragmentary section view taken on the line 25—25 of Fig. 17, illustrating the details of mounting of the lever that opens the film magazine shutter.

The bottom wall 17 of the drawer 14 has a projecting headed pin 34 which rides in a recess 35 (see Figs. 6, 17, 22 and 23) that is formed in the partition wall 36 between the casing section 1 and the casing section 2. The recess 35 extends beyond that part of the partition wall 36 that lies beneath the cover plate 8 and the extended part of the recess is formed with opposite overhanging flanges 37 and 38, which flanges are adapted to engage under the head of the pin 34 in the manner illustrated in Fig. 17 so as to aid in guiding the drawer 14 when it is moved to its outermost position. The flanges 37 and 38 are formed by cutting the partition wall 36 and bending the metal toward the drawer 14 as illustrated in Fig. 23. In order to close the opening thus formed in the wall 36 an auxiliary plate 39 is welded to the wall 36 to cover the opening.

The cover plate 8 is provided with a projecting lug 40 which is provided with a recess 41 in its under surface. A pivoted latch bar 42 is mounted in the end wall 21 of the drawer by means of a shaft 43 which has a handle 44 thereon. When the handle 44 is in the full line position shown in Figs. 1 and 21 the latch bar 42 is moved up into engagement with the recess 41 so as to lock the drawer in closed position. When the handle 44 is moved into the full line position shown in Figs. 4, 5 and 6 the latch bar is horizontal, that is, parallel with the bottom of the drawer so that the drawer may be opened.

The drawer 14 is adapted to receive a magazine 45 which contains a roll of film. This magazine is of the type now commercially available on the market, such for example as that shown in the patent to Lechleitner No. 2,241,265. These film magazines are sealed with the film therein and are provided with shutters which may be opened to expose the film by rotating a projecting pin 46 that extends through the outer shell of the film magazine. The film magazine is of the type heretofore referred to at the beginning of the specification and is shown more in detail in Figs. 10 to 14 of the drawings. When the camera is loaded with a film magazine the drawer 14 is opened to the position shown in Figs. 4, 5 and 6 of the drawings so that a film magazine 45 may be inserted in the manner shown in Fig. 4. Near the rear wall 21 the drawer 14 has a positioning lug 47 against which the back side of the film magazine is adapted to engage. The projection 46 which is located at the front face of the film magazine is inserted into a polygonal socket 48 that is axially located in the hub of a pivoted lever 49, the lever 49 being pivoted in the front wall 18 of the drawer 14. As shown best in Fig. 20, the front wall 18 is hollowed out or recessed as indicated at 50 to provide space for the lever 49 and a cooperating link 51 that is connected therewith by a pin 52 on the link and a slot 53 in the lever. A thin cover plate 54 is applied over the face of the wall 18 to cover the lever 49 and the link 51, this plate being provided with a small aperture 55 directly over the polygonal socket 48 in the hub of the lever 49.

Figure 12:
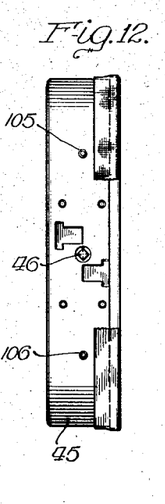
Fig. 12 is a side view of the film magazine.
Figure 13:
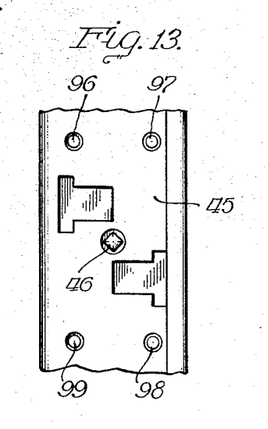
Fig. 13 is an enlarged fragmentary side view of a portion of the film magazine with the shutter closed.
Figure 14:
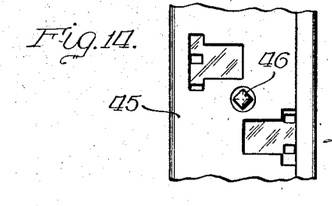
Fig. 14 is a view similar to Fig. 13 with the shutter open.

When the film magazine 45 is inserted, in the fashion just described, into the drawer 14 the pin 46 is not rotated and therefore the film magazine shutter remains closed in the position illustrated in Figs. 12 and 13 of the drawings. The film magazine however is seated flat in the bottom of the drawer and partially prepared for operation of the film winding reels that are located therein. The construction of the film magazine is such that on one side of it there is provided a clutch member 56 (see Fig. 10) by which one of the film reels or cores therein may be turned and a reel releasing plug 57 by which the other film reel or core therein may be released for turning. On the other side of the film magazine there is a clutch member 58 opposite the release plug 57 and a release plug 59 opposite the clutch member 56. The drawer 14 has in the bottom thereof a post 60 which is adapted to engage one of the plugs 57—59 and a clutch member 61 that is adapted to engage one of the clutch members 56—58 depending upon which side of the film magazine is placed in contact with the bottom 17 of the drawer. The clutch member 61 is journaled in the bottom wall 17 of the drawer and is operatively connected to a driving gear 62 as illustrated best in Fig. 16 of the drawings. The parts by which the clutch member 61 and the gear 62 are connected comprise a hollow sleeve 63 on the gear, a hub 64 on the clutch member 61, slidably but non-rotatably fitted on the sleeve 63, and a screw 65 threaded into the sleeve 63 to hold the hub 64 in place. A bearing 66 for the sleeve 63 is fastened in the drawer bottom 17. The drawer bottom is recessed at 67 to receive the clutch member 61.

The gear 62 is driven by means of a gear 68 journaled in the partition wall 36 and driven by a gear 69 which is driven by the spring motor of the camera. The gear 62 is withdrawn out of mesh with the gear 68 when the drawer is opened so that if the camera motor were accidentally started without the drawer being closed there of course would be no connection by which to drive the film in the magazine 45 even though such magazine were inserted in the drawer 14.

The magazine drawer 14 also carries a spring arm 70 with which to engage the upwardly facing film reel release lug and release it when the drawer is closed. The spring arm 70 is mounted upon a bracket 71 that is fastened to the front wall 18 of the drawer 14. This spring arm normally tends to bend outwardly away from the drawer in the manner illustrated in Fig. 5. It is guided in a recess 72 formed in the inner face of the cover plate 8 so that as the drawer is closed it is forced against a film magazine seated in the drawer. At its free end the arm 70 carries a pin 73 which is adapted to engage the release plugs 57 and 59. When the drawer is fully closed the pin 73 occupies the position shown in Fig. 16 so that it will serve to effectively release a film reel in the film magazine.

Figure 18:
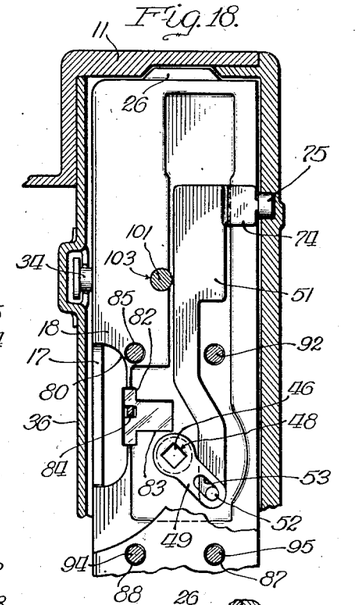
Fig. 18 is a fragmentary sectional view taken on the line 17—17 of Fig. 2 but with the front plate of the film magazine-receiving drawer broken away.
Figure 19:
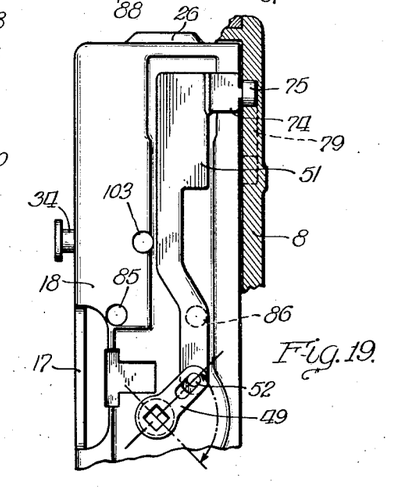
Fig. 19 is a view similar to Fig. 18 but showing the parts in changed position where the drawer is open and the film magazine shutter closed.

Means are provided whereby the movement of the drawer to closed position will cause the link 51 to move the lever 49 through approximately a quarter of a turn so as to open the film magazine shutter by rotation of the projection 46. This means comprises an upstanding lug 74 on the link 51 (see Figs. 18 and 19) and a roller 75. The lug 74 is guided between the spaced portions 76 and 77 of the plate 54 and the drawer front wall 18. The roller 75 extends into a cam slot 78 that is formed in the cover plate 8. This came slot 78 is so arranged as to hold the roller in position to maintain the shutter of the film magazine closed until the drawer is close to its closed position. Then the cam slot is directed diagonally toward the lever 49 as indicated at 79 so that further closing of the drawer moves the link 51 from the position shown in Fig. 19, for example, to the position shown in Figs. 17 and 18 to open the film magazine shutter.

As shown best in Figs. 15 to 19, inclusive, the front wall 18 of the drawer 14 is cut away near the bottom wall as indicated at 80 so as to provide room for a portion 81 of the film claw operating member. The front wall 18 is also cut away as indicated at 82 and 83 to provide space for operation of the film claw 84 and to provide an aperture in which a portion of the film to be exposed is framed. The front wall 18 is also provided with a series of four apertures 85, 86, 87 and 88 to receive film gate positioning pins on the camera frame member 7. The frame member 7 has a projecting ring 89 thereon which is adapted to receive the lens unit 5. The member 7 also has a plate 90 fastened thereon by suitable screws 91. This plate is provided with four pins 92, 93, 94 and 95 that are positioned to engage in the apertures 85, 86, 87 and 88 provided in the front plate 13 and pass through these apertures into engagement with lugs 96, 97, 98 and 99 that are mounted on the film gate within the film magazine 45 (for details of this construction see the Lechleitner patent hereinbefore referred to). The cover plate 54 is also provided with apertures to permit the passage of the pins 92, 93, 94 and 95. It will be noted that the cover plate has a considerably larger cutout portion in front of the cutout portion 80 of the front wall 18. This cutout portion is indicated at 100 in Fig. 17. Thus the openings 86, 87 and 88 in the wall 18 are in line with corresponding openings in the plate 54, but the opening 85 is uncovered by the cutout portion 100.

The plate 90 also has two projecting stop pins 101 and 102 (see Figs. 6 and 15). These pins are adapted to pass through corresponding openings 103 and 104 in the cover plate 54 and the front wall 18 so as to engage the film magazine at the points 105 and 106 indicated in Fig. 12. The pins 92, 93, 94 and 95 are somewhat longer than the pins 101 and 102 so that they may engage the lugs 96, 97, 98 and 99 as the film magazine is advanced and before it contacts the pins 101 and 102 to make sure that the film gate itself is accurately located with respect to the focus of the lens.

The film engaging claw 84 and its drive member 81 are driven by a cam 107 (see Fig. 15). The drive member 81 is guided by two ears 108 and 109 thereon, which ears receive guide pins 110 and 111 that are carried by the partition wall 36. The partition wall as illustrated in Fig. 15 is provided with upstanding lugs 112, 113, 114 and 115, which lugs support the pins 110 and 111. The plate 90 is of course provided with a framing aperture 116 and the claw 84 travels in a path alongside the framing aperture 116 so as to engage in the notches of the film in the magazine 45. The camera shutter is indicated at 117 in Fig. 15. Driving means indicated generally at 118 in Fig. 6 is adapted to drive the cam 107 and the shutter 117. The details of this mechanism however form no part of the present invention and therefore will not be further described.

Figure 4:
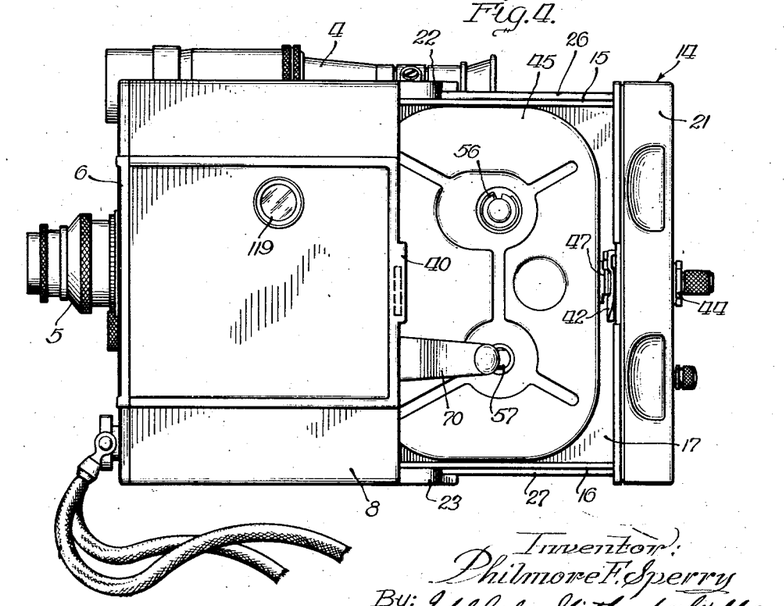
Fig. 4 is a view in side elevation similar to Fig. 2 but showing the film magazine drawer partly open and a film magazine therein.

The operation of the apparatus hereinbefore described has been pointed out somewhat in detail in connection with the general description. When the camera user desires to load the camera the first step is to move the locking lever 44 into the position shown in Fig. 5 and to pull the drawer out as far as it will go as shown in Figs. 4, 5 and 6. The film magazine 45 is then inserted in the manner illustrated in Fig. 5 and pressed down into the drawer until it occupies the position illustrated in Fig. 4. This brings the projection 60 into engagement with one of the releasing plugs 57—59 and brings the clutch member 61 into engagement with one of the clutch members 56—58. The pin 46 is forced into the socket 48 to the position illustrated in Fig. 25. The operator then closes the drawer 14 to the position illustrated in Fig. 21. In the closing operation the spring arm 70 is forced down by the cover plate 8 so as to bring its pin 73 into engagement with the release plug on the top of the film magazine 45. The film magazine shutter remains closed as the drawer moves toward closed position until the roller 75 on the link 51 reaches the diagonally directed portion 79 of the cam slot 78 in the cover plate 8. When this point is reached the drawer is sufficiently closed to seal the magazine-receiving chamber against the entrance of any light through the exposure openings in the film magazine. The front wall 18 and the plate 54, together with the film magazine itself, effectively block light entrance to the film as the film magazine shutter is opened by movement of the roller 75 along the cam slot portion 79. When the drawer is closed to its final position the handle 44 is moved up to the position shown in Figs. 1 to 3 and 21 so as to lock the drawer in closed position. In this closed position the film magazine shutter is opened and the film magazine is moved so far forward that the film therein is engaged by the claw 84. Also, the film is accurately positioned with respect to the lens by means of the pins 92, 93, 94 and 95 which pass through the front wall 18 and into engagement with the lugs 96, 97, 98 and 99 that are on the film gate in the film magazine. The film moving claw 84 does not need to be forced forward and in fact is not forced forward in the loading of the camera. The film magazine is moved into position to engage the claw with the film therein only after it is accurately positioned and aligned by the drawer 14. It is impossible with this arrangement to damage the film moving claw in any way.

With this apparatus the film magazine can be left in the camera until part of the film is exposed therein and then taken out with perfect safety because the film magazine shutter must be closed by the act of opening the drawer 14. It is therefore possible for the operator to interchange film magazines at will in order to take different types of pictures. For example, a part of a magazine of color film may be taken and the color film then removed and a black and white film magazine substituted for it. Later the color film magazine may again be inserted whenever desired.

Means is provided whereby the operator may determine at any time whether the film is actually being moved in the camera. This means comprises a window 119 which is mounted in the cover plate 8 directly over the position that is occupied by the top clutch members 56—58 when the bottom clutch member is engaged with the clutch member 61 of the drawer 14. The operator can see through the window 119 whether or not the clutch member is turning. This feature is of advantage in enabling the operator to determine whether or not he has put the film magazine in correct position after having exposed one-half of the double track 8 mm. film therein. If he inserts the film magazine in the same position as it was before and attempts to operate the camera the exposed clutch member will not turn since there is no longer any film to be wound in that direction. The operator can then turn the magazine over so as to get it in proper position.

It is believed that the foregoing description will enable those skilled in this art to understand the nature of this invention and the operation of the apparatus embodied in it.

Having thus described my invention, what I claim as new and desire to secure by Letters Patent is:

1. In a photographic apparatus, the combination with a casing providing a magazine chamber adapted to receive a film magazine having a normally closed shutter, said casing also providing a film advancing means including a claw member in said chamber for entering the magazine to move a film therein, of a film magazine carrier movable in said chamber between an outer position where a film magazine may be placed thereon and an inner position where the film magazine is positioned to bring the film therein into contact with the claw member, and a shutter operating means on said carrier operable to open a shutter on the film magazine as the carrier approaches inner position, whereby to provide an opening to the film for said claw member as the magazine is moved to final operating position.

2. In a photographic apparatus, the combination with a casing providing a magazine chamber adapted to receive a film magazine having a normally closed shutter, said casing also providing a film advancing means including a claw member in said chamber for entering the magazine to move a film therein, of a film magazine carrier movable in said chamber between an outer position where a film magazine may be placed thereon and an inner position where the film magazine is positioned to bring the film therein into contact with the claw member, a shutter operating means comprising a lever on the carrier and means on the casing operatively connected with the lever to move it from one position to another as the carrier approaches inner position, whereby to provide an opening to the film for said claw member as the magazine is moved to final operating position.

3. In a photographic apparatus, the combination with a casing providing a magazine chamber adapted to receive a film magazine having a normally closed shutter, said casing also providing a film advancing means including a claw member in said chamber for entering the magazine to move a film therein, of a drawer mounted in said casing for movement into said chamber to bring a film magazine carried by the drawer into position to cause the film in the magazine to engage the claw member in its normal operating position, and film shutter opening means in said drawer adapted to be operatively engaged with the shutter means of a film magazine when the magazine is inserted in the drawer.

4. In a photographic apparatus, the combination with a casing providing a magazine chamber adapted to receive a film magazine having a normally closed shutter, said casing also providing a film advancing means including a claw member for entering the magazine to move a film therein, of a closure member adapted to close said chamber and movable relatively to the casing for insertion of a film magazine into the chamber, and film shutter opening means operable by movement of said closure member to closed position to open the film shutter, said shutter opening means comprising a lever pivotally mounted on said closure member in position to engage a film magazine shutter part when the magazine is placed in position for movement into said chamber, and means on the casing for causing movement of the lever as the closure member closes.

5. In a photographic apparatus, the combination with a casing providing a magazine chamber adapted to receive a film magazine having a normally closed shutter, said casing also providing a film advancing means including a claw member in said chamber for entering the magazine to move a film therein, of a film magazine carrier movable in said chamber between an outer position where a film magazine may be placed thereon and an inner position where the film magazine is positioned to bring the film therein into contact with the claw member, and a shutter operating means on said carrier operable to open a shutter on the film magazine as the carrier approaches inner position, whereby to provide an opening to the film for said claw member as the magazine is moved to final operating position, said shutter operating means comprising a lever in the carrier positioned to operatively engage the film magazine shutter when the magazine is inserted, and means operable by closure of said carrier to move the lever to shutter opening position.

6. In a photographic apparatus, the combination with a casing providing a magazine chamber adapted to receive a film magazine having a normally closed shutter, said casing also providing a film advancing means including a claw member in said chamber for entering the magazine to move a film therein, of a drawer mounted in said casing for movement into said chamber to bring a film magazine therein into position to cause the film in the magazine to engage the claw member in its normal operating position, said casing having positioning pins projecting into the magazine chamber for cooperation with a film magazine, and said drawer having a front wall provided with apertures for the passage of said pins to the film magazine.

7. In a photographic apparatus, the combination with a casing providing a magazine chamber adapted to receive a film magazine having a normally closed shutter, said casing also providing a film advancing means including a claw member in said chamber for entering the magazine to move a film therein, of a drawer mounted in said casing for movement into said chamber to bring a film magazine therein into position to cause the film in the magazine to engage the claw member in its normal operating position, said casing having positioning pins projecting into the magazine chamber for cooperation with a film magazine, and said drawer having a front wall provided with apertures for the passage of said pins to the film magazine, said drawer and casing having cooperating film magazine shutter opening means thereon operable to open the film magazine shutter before the film magazine reaches final position.

8. In a photographic apparatus, the combination with a casing providing a magazine chamber adapted to receive a film magazine having a normally closed shutter, said casing also providing a film advancing means including a claw member in said chamber for entering the magazine to move a film therein, of a drawer mounted in said casing for movement into said chamber to bring a film magazine carried by the drawer into position to cause the film in the magazine to engage the claw member in its normal operating position, and means operable by movement of said drawer to closed position to open the film magazine shutter.

9. In a photographic apparatus, the combination with a casing providing a magazine chamber adapted to receive a film magazine having a normally closed shutter, said casing also providing a film advancing means including a claw member in said chamber for entering the magazine to move a film therein, of a drawer mounted in said casing for movement into said chamber to bring a film magazine therein into position to cause the film in the magazine to engage the claw member in its normal operating position, and means operable by movement of said drawer to closed position to open the film magazine shutter, said last named means comprising a cam on the casing, a lever on the drawer and a cam engaging member connected with the lever.

10. In a camera, a film magazine drawer having a magazine film core lock releasing post in the bottom thereof and a film core lock releasing pin facing the bottom of the drawer, and movably supported by the drawer, whereby a film magazine can be inserted beneath the pin.

11. In a camera, a film magazine drawer having a magazine film core lock releasing post in the bottom thereof, a clutch member rotatably supported on the bottom of said drawer in spaced relation to said post, and a film core lock releasing pin facing the bottom of the drawer, and movably supported by the drawer, whereby a film magazine can be inserted beneath the pin.

12. In a camera, the combination with a casing providing a film magazine chamber adapted to receive a film magazine having a normally closed shutter, said casing having therein a film advancing means for entering the magazine to move a film therein, of a drawer having a front wall in said chamber and means on said front wall to open the film magazine shutter, said drawer having oppositely directed magazine film core lock releasing members therein, one being movable away from the other to allow insertion of a film magazine, and means on the casing to press said movable releasing member into operative position as the drawer is closed.

13. In a camera, the combination with a casing providing a film magazine chamber adapted to receive a film magazine having a normally closed shutter and having on each side thereof an exposed film core lock and an exposed film core rotating clutch member, the lock on each side being opposite the clutch on the other side, of a drawer having means to engage the film core locks and one of the clutch members of a film magazine inserted therein, said drawer being mounted in the casing for movement to bring an inserted film magazine into said chamber and having a closure for said chamber, said casing having a window in the side face thereof exposing to view the other clutch member of an inserted film magazine when the drawer is in closed position.

14. In a photographic apparatus, the combination with a casing providing a magazine chamber adapted to receive a film magazine having a normally closed shutter, said casing also providing a film advancing means including a claw member in said chamber for entering the magazine to move a film therein, of a drawer mounted in said casing for movement into said chamber to bring a film magazine therein into position to cause the film in the magazine to engage the claw member in its normal operating position, and means operable by movement of said drawer to closed position to open the film magazine shutter, said drawer having a front wall provided with an aperture through which said claw member enters the film magazine.

15. In a camera, the combination of a drawer adapted to have a film magazine removably mounted thereon, a post in position on the drawer adapted by engagement with a core locking means on one face of said magazine to release said core, a clutch member rotatably mounted on said drawer in position for engagement with a cooperating clutch member on said magazine for effecting a movement of the film in the magazine, and a driving member rotatably mounted on said drawer and operatively connected with said first-named clutch member for rotating it.

16. In a camera, the combination of a drawer adapted to have a film magazine removably mounted thereon, a post in position on the drawer adapted by engagement with a core locking means on one face of said magazine to release said core, a clutch member rotatably mounted on said drawer in position for engagement with a cooperating clutch member on said magazine for effecting a movement of the film in the magazine, a pin yieldingly mounted on said drawer adapted by engagement with a second core locking means on the opposite face of said magazine to release said second core, and a driving member rotatably mounted on said drawer and operatively connected with said first-named clutch member for rotating it.

17. In a photographic apparatus adapted to receive and position for exposure a film magazine having a normally closed shutter and having at opposite faces thereof exposed film core locks and exposed film core rotating clutch members, the combination of a casing having a magazine chamber therein, a drawer slidably mounted in said casing, film core lock engaging means on said drawer adapted by the movement of the magazine into operative position in the drawer and the movement of the drawer into operative position in the casing to release both of said locks, and means on said drawer in position for engagement with one of said clutch members for rotating it.

PHILMORE F. SPERRY.